Figure 1:
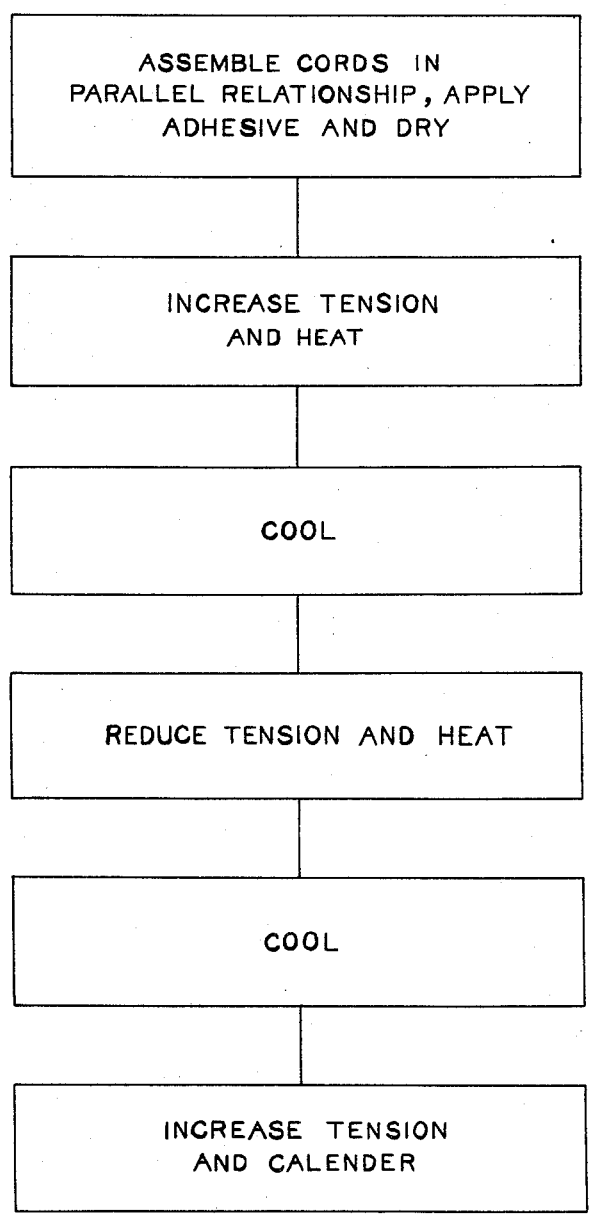

April 12, 1960
M. W. WILSON
2,932,078
PROCESS FOR TREATING CORDS
Filed Nov. 12, 1958
2 Sheets-Sheet 2
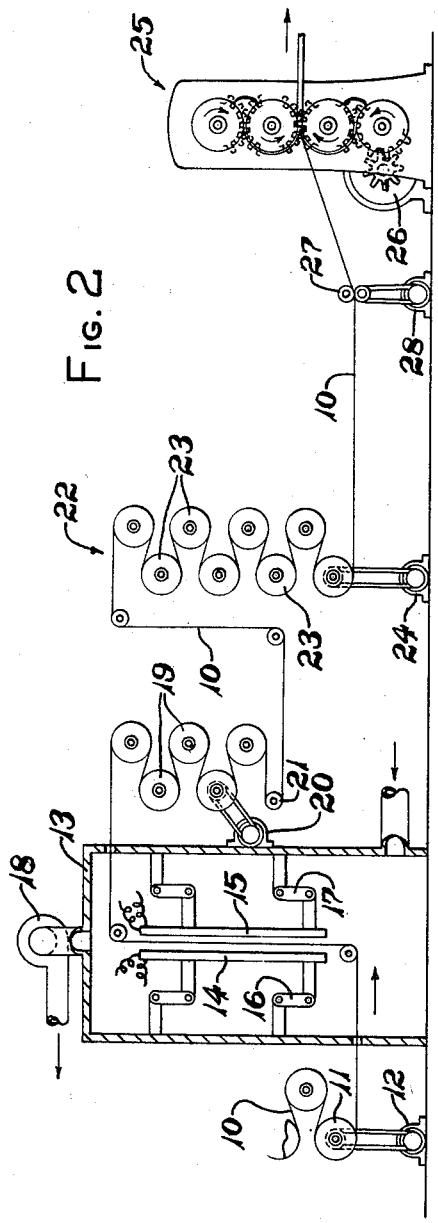
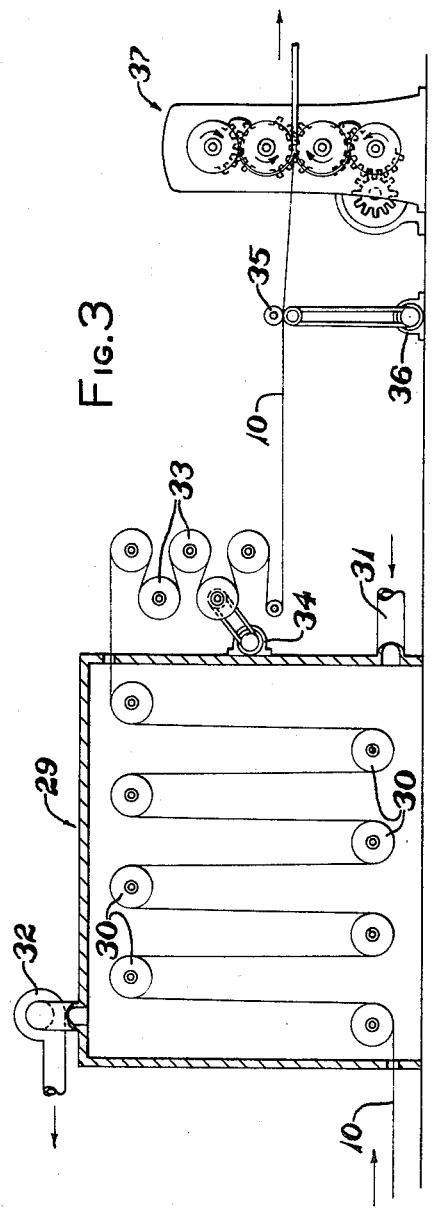
INVENTOR.
MATTHEW W. WILSON
BY

United States Patent Office 2,932,078
Patented Apr. 12, 1960

2,932,078

PROCESS FOR TREATING CORDS

Matthew W. Wilson, Stow, Ohio, assignor to The B. F. Goodrich Company, New York, N.Y., a corporation of New York Application November 12, 1958, Serial No. 773,290

16 Claims. (Cl. 28—72)

This invention relates to a process for treating cords and, more particularly, to a process for reducing the heat shrinkage of cords that are employed as reinforcements in elastomeric material.

Cords employed as reinforcements in elastomers are frequently formed of a plurality of filaments twisted together, the twisting being provided to increase flex strength or other desirable characteristics. Such cords, especially those formed of filaments of high polymeric thermoplastic material, as for example, the linear polyamides commonly known as nylon, tend to elongate or "grow" when placed under tension and subjected to heat. This characteristic is undesirable in many articles since it results in change of dimensions of the article that, in turn, may cause cracking, ply separation or other defects. For example, inflatable tires formed of rubber reinforced by twisted nylon cords have been known to increase in transverse dimensions or grow to such an extent as to cause objectionable cracks in the tread and sidewalls. It is now known that such cord elongation can be reduced to a satisfactory extent by heating the cords to an elevated temperature, stretching the heated cords, and then cooling them while maintaining the stretching tension. Unfortunately, however, cords of high polymeric material which have been heat set to remove elongation tend to shrink when subsequently subjected to elevated temperatures. Thus, cords of linear polyamide filaments which have been heat set and incorporated into vehicle tires have been found to shrink during curing of the tires to an extent which distorts the shape of the tire and/or improperly displaces the edges of the reinforcing plies containing such cords thereby causing bead defects.

The principal object of this invention is the provision of a cord treating process which reduces the shrinkage of heat set cords that are formed of high polymeric thermoplastic material.

A more specific object of the invention is the provision of a cord treating process which reduces the shrinkage of heat set linear polyamide cords to an extent such that articles formed of elastomer in which the cords are incorporated are not distorted or otherwise damaged by cord shrinkage during cure of the article.

A further object of the invention is an improved cord treating process which combines a heat setting and shrinkage reduction treatment as part of a single continuous operation thereby producing cords having improved tensile stability at elevated temperatures.

An additional object of the invention is to provide an improved process for reducing thermal elongation and shrinkage of cords formed from linear polyamide filaments as a part of an uninterrupted preparation of the cords for use as reinforcements in elastomeric articles, the process including the application of cord-to-elastomer adhesion-promoting substance to the cords, raising the temperature of the cords to near but below the melting point of the cord material for a time interval less than that required to melt the cords while under increased tension, reducing the temperature of the cords while maintaining the tension, reducing the tension and elevating the temperature of the cords to a value less than that during the first heat treating step, thereafter cooling the cords under the reduced tension, and calendering an elastomeric material on the cords while the latter are under a tension greater than that during the second heat treatment.

Further objects and advantages of the invention will be apparent to those skilled in the art to which it pertains from the following description of the presently preferred embodiment and a modification thereof described with reference to the accompanying drawings, forming a part of this application, in which:

Fig. 1 is a chart illustrating the sequential steps of the continuous process for preparing cords for incorporation into articles containing an elastomeric material;

Fig. 2 is a somewhat schematic view, partially in longitudinal section and partially in side elevation, showing an arrangement of instrumentalities for applying the process to reduce both thermal elongation and shrinkage of the cords and to calender elastomeric material on the cords; and Fig. 3 is a somewhat schematic view, partially in longitudinal section and partially in side elevation, showing a modified apparatus for applying the process to reduce shrinkage of heat set cords.

The invention will be described with specific reference to its use in preparing cords for incorporation into rubber articles, such as tires, by forming a plurality of the cords into an elastomeric coated web of weftless fabric with the individual cords disposed in planar parallel relationship and retained therein by the rubber or other elastomeric material calendered thereon. As indicated in Fig. 1 of the drawings, the cords for preparing a weftless fabric of this nature are directed into a planar parallel arrangement and are led in this relationship through a means for applying an elastomer adhesion-promoting substance which is in liquid form. Excess liquid is then removed from the cords and they are dried with a tension of low order preferably being imposed upon the cords during drying. The tensioned and at least partially dried cords are then heated and further tensioned to effect elongation with the cords being cooled while subjected to the increased tension. These procedural steps are fully described and claimed in U.S. Patent 2,846,752 to which reference may be had for disclosure of a suitable apparatus to perform the steps and for the further details thereof.

One form of suitable instrumentality by which treatment for reduction of heat shrinkage may be effected in combination with a heat setting treatment is illustrated in Fig. 2. As indicated in that figure the cords 10 after they have been assembled in parallel relationship, provided with adhesion-promoting substance, dried and subjected to a first-stage heating and stretching operation, as disclosed and claimed in U.S. Patent 2,846,752, are, as is also disclosed in that patent, led from the last of a plurality of heated cans or rolls 11, which are driven by a motor 12, into a region of high heat and increased tension to effect the major portion of the stretching operation. In this region, comprising the housing 13, the cords are conducted past a source of radiant heat. As here shown, the radiant heat is supplied by opposed platens 14 and 15 which are preferably electrically heated and which are disposed closely adjacent the cords in a vertical arrangement so that the atmosphere surrounding the cords in the region of high heat is of relatively small volume with the platens providing a chimney effect to facilitate removal of the atmosphere surrounding the cords. The platens 14 and 15 are mounted upon suitable linkages such as 16 and 17 which may be connected to means, not shown, for moving the platens from the positions indicated, wherein they are closely adjacent the cords, the positions spaced therefrom to thus prevent injury to the cords in the event of stoppage or slowing of movement therepast. Preferably, the housing 13 in which the platens or other source of radiant heat are located is closed and a suitable means, such as a blower 18, is provided to remove the fumes resulting from heating the cords which, it will be remembered, were provided with an adhesion-promoting substance.

After passing between the heated platens 14 and 15, the cords 10 are led from the chamber or housing 13 over a plurality of snubbing and cooling rolls 19 at least one of which is driven by a suitable means such as a motor 20. The rolls 19 may be hollow to permit the introduction of temperature conditioning fluid if this should be considered necessary or desirable. The speed of rotation of the motor 20 is so controlled relative to the speed of rotation of motor 12 that the tension on the cords 10 is increased between the last of the heating and drying cans or rolls 11 and the snubbing rolls 19 with the result that the cords 10 are stretched as they are subjected to the high heat provided by the platens and are cooled while under the increased tension which caused the stretching.

The cords 10, in their passage between the platens 14 and 15, are heated to a temperature near but below the melting point of the material from which the cords are made for a very short interval of time while the cords are under the increased tension provided by the aforementioned difference in speed between the motors 12 and 20. The temperature to which the cords are actually subjected must, of course, be correlated to the time during which the cords are thus treated so that the cords do not actually melt and the tension must not be so high as to cause excessive stretching or breakage of the cords. Experiments have shown that satisfactory results are achieved with nylon cord of the type commonly employed in tires when the temperature is in the range of 400° to 450° F. for a treatment time of 4 to 15 seconds and with the cords under a tension of from 3 to 5 pounds per cord, the tension occasionally being increased to as high as 6 pounds per cord without deleterious effects. As the cords emerge from the region of high temperature provided with the platens 14 and 15, they are rapidly cooled while maintained under the tension to which they were subjected during passage between the platens so that the temperature of the cords drops below 250° F. and in some instances below 150° F. This rapid drop of cord temperature can be effected by simply permitting the cords to air cool as they move about the snubbing drums 19 but means may be provided to increase the rate of cooling if desired.

This brief high temperature heating under increased tension and immediate cooling of the cords while still subjected to the increased tension removes a substantial proportion of their tendency to stretch when they are subsequently incorporated into elastomer-containing articles, such as tires, cured, and then subjected to operating conditions. However, as mentioned heretofore, the cords tend to shrink when heated during curing of the articles in which they are incorporated and this shrinkage produces defects in the articles, which defects can frequently be only partially removed by slow cooling after curing. The shrinkage of the cords is reduced to acceptable limits, in accordance with this invention, by subjecting the cords to a relaxation treatment. This treatment comprises again heating the cords to a temperature lower than that employed during the reduction of elongation but higher than that to which the cords are subjected during curing of the articles in which they are incorporated, the heating being effected with the cords under a tension which is greatly reduced from that to which they were subjected during the high heat of the elongation reducing treatment.

The relaxation treatment, in the presently preferred embodiment of the invention, is effected as part of a continuous process of preparing the cords for incorporation into articles containing an elastomer. Thus, as illustrated in Fig. 2, the cords 10, after leaving the cooling and snubbing rolls 19, are led over one or more direction changing rolls 21 to a temperature and tension controlling unit 22 which is shown as comprising a plurality of cans or rolls 23, at least the last in the train of which is driven by a motor 24. The speed of the motor 24, relative to the speed of motor 20, is such that the tension on the cords 10 is reduced from a value in the order of 3 to 5 pounds per cord to which they were subjected during the heat setting operation provided to an amount in the range of 0.25 to 0.75 pound per cord. The first or upper cans or rolls 23 are provided with heating means, as for example steam under pressure, such that the cord temperatures in passing thereover are elevated to a value above 250° F. and less than that employed during the elongation removing treatment, the temperature of the cords being preferably in the range of 300° to 380° F., with the time required for passage of the cords over the heated cans or rolls 23 being preferably more than 5 and less than 30 seconds.

The elevation of temperature of the cords relaxes the tension stresses introduced during the previous heat setting operation and the reduced tension of the cords during relaxation treatment permits the cords to shrink, the effect being analogous in many respects to annealing of iron or steel. The shrinkage of the cords is terminated and the dimensional stability of the cords established by cooling the cords from the aforementioned temperature in the range of 300° to 380° F. to a temperature below 250° F. while the cords are still under the aforementioned reduced tension of 0.25 to 0.75 pound per cord. This may be achieved by simply omitting the use of pressure steam in one or more of the cans or rolls 23 adjacent the end of the train or by replacing steam with a cooling fluid.

The cords after being subjected to the relaxation treatment are then preferably provided with a coating of an elastomer as a part of the continuous treatment process. This is achieved in the embodiment illustrated in Fig. 2 by directing the cords, as they leave the unit 22, for passage to and through a calendering unit 25 which is of conventional construction comprising a plurality of superposed rolls for supplying rubber or equivalent elastomeric material on the opposite sides of the cords 10 as they pass through the unit. The movement of the cords through the calender 25 is effected by the pull exerted thereon by the rolls of the calender which are driven by the motor 26. In the event it is found that a calendering operation cannot be conveniently effected upon the cords 10 while under the reduced tension to which they are subjected as they issue from the relaxation unit 22, a suitable pair of driven rolls 27, operated by motor 28, may be employed to increase the tension of the cords before passage through the calender 25. Thus, in the illustrated embodiment, the cords issuing from the unit 22 having tensions in the range of 0.25 to 0.75 pound per cord are additionally tensioned to an amount in the order of 1.50 pounds per cord by the driven rolls 27 through operation of the motor 28 at the appropriate speed higher than that of the motor 24. The calendering operation is facilitated by the fact that the cords 10 possess residual heat from the relaxation operation and hence do not need to be again heated before calendering.

The elevation of the temperature of the cords to a value in the range of 300° to 380° F. while the cords are under reduced tension to effect the aforementioned shrinkage or relaxation of the cords can be effected by instrumentalities other than those indicated as comprising the unit 22 of Fig. 2. Thus, as shown in Fig. 3, the cords delivered from the snubbing and cooling cans or rolls 19 of an elongation reduction operation can be heated by passage through a suitable chamber or housing 29 in which the cords are moved in a serpentine or tortuous path by passage over suitable direction changing rolls such as 30 while the cords are subjected to the application of heat. This heat may be supplied by introducing heated gas into the enclosure or housing 29 through a suitable opening such as 31, the heating medium being removed from the housing by a blower 32. In place of the heated gas circulating through the cords in the housing 29, suitable heated coils or platens may be provided adjacent the cords in their path to raise the temperature of the cords to the desired value. The cords issuing from the housing or chamber 29 may then be led over cooling and snubbing rolls or drums 33 at least one of which is driven by a motor 34, the speed of which, relative to the motor 20 in the heat setting operation, is such that the tension of the cords in passage through the housing 29 and over the drums 33 is reduced to an amount in the range of 0.25 to 0.75 pound per cord. The effect of the operation of this apparatus is the same as that described with respect to the unit 22 of Fig. 2. After treatment by the means shown in Fig. 3, the cords may have the tension thereof increased by driven rolls 35, actuated by a motor 36, to provide a tension in the range of 1.50 pounds per cord under which tension the cords are provided with an elastomeric coating during passage through a calender 37 in the same manner as explained above for the treatment of the cords in the manner shown in Fig. 2.

A specific example of the temperatures and tensions employed in practicing the above-described process will now be given with respect to its application to nylon cord of the type commonly employed in tires and which is known as a 840/2 construction. Such a cord comprises two bundles or strands of filaments of 840 denier with the filaments of the strands appropriately twisted and the strands again twisted together to form the cord which has a diameter in the order of .02 inch. These cords are conventional supplied from the manufacturer thereof in the form of cones or packages. The individual cords are drawn from such cones or packages and moved under low tension through suitable guiding means, not shown, but which are disclosed in the aforementioned U.S. Patent 2,846,752, into a planar parallel relationship to comprise a weftless web. This web of cords is then provided with an adhesion-promoting substance, such as a liquid dispersion or suspension of resorcinol formaldehyde latex, and the cords are dried. During the latter part of the drying operation the temperature of the cords may be elevated and the tension thereon increased to begin the treatment for removal of elongation as is also explained in the aforementioned U.S. Patent 2,846,752. Alternatively, the entire elongation removing operation can be effected in a single step after the cords are dried.

In either the two-step or single step elongation removing operation the temperature of the cords is raised to an amount in the range of 400° to 450° F. for a time interval of 4 to 15 seconds while the tension on the cords is in the order of 3 to 5 pounds per cord. This tension may also be expressed as being in the range of 0.76 to 1.35 grams per denier which provides a measure of the tension applicable to cords other than the 840/2 construction. The tension on the cords is maintained after the brief heating to the aforementioned elevated temperature while the temperature of the cords is cooled to below 250° F. and preferably to approximately 150° F.

The cords are next subjected to the shrinkage reduction or relaxation treatment by reducing the tension thereon from the aforementioned value employed during the elongation reduction treatment to an amount of 0.25 to 0.75 pound per cord or 0.06 to 0.20 gram per denier. While under this reduced tension, the cords are heated to a temperature in the range of 300° to 380° F. for a time interval in the range of 5 to 25 seconds, it being understood that when the temperature is in the lower portion of its range the time interval will normally be in the upper portion of its range, and conversely. When the cord temperature is in the range of 350° F. a preferred time interval is in the range of 12 seconds whereas, when the range of cord temperature is 360° to 380° F. the time interval may be 5 to 10 seconds with 10 seconds being preferred and with greater relaxation being achieved if the time of treatment be increased to 12 seconds. It will also be understood that shorter time intervals can be employed with cord tensions in the lower portion of the range than with those in the upper portion of the range.

The temperature of the cords at the end of the relaxation treatment should be less than 250° F. the lower limit being determined by the subsequent treatments. Thus, when the cords are to be calendered with an elastomeric material substantially immediately after the relaxation treatment, the temperature of the cords entering the calender should preferably not be below 150° F. The calendering operation is also facilitated by increasing the tension on the cords, the tension of the cords entering the calender preferably being in the range of 1.00 to 1.50 pounds per cord or 0.25 to 0.38 gram per denier.

Although the invention has been specifically described with respect to providing both an elongation and shrinkage reduction treatment as part of a single continuous process for preparing the cords to be incorporated into elastomeric articles, it will be apparent that the advantages of shrinkage reduction can also be achieved in cords that have been previously heat set as a separate and independent operation. Thus, cords which have been heated to a high temperature while under stretching tension, to thereby remove elongation, and then have been cooled, can at any subsequent time, before incorporation into elastomeric material, be treated to reduce shrinkage by elevating the temperature of the cords while the cords are under the low tensions as set forth above with the cords being cooled subsequent to this heat shrinkage or relaxation treatment. Cords receiving the relaxation treatment may immediately thereafter be calendered with rubber as herein illustrated and described or again allowed to cool, stored, and have the rubber covering supplied at a still later time. It will be apparent, however, that the maximum economies are effected when the treatment to remove elongation, the treatment to remove shrinkage, and the providing of a layer of elastomeric material by calendering or the like are all effected as a single continuous operation since this reduces the handling of the material and conserves the heat employed in the different operations. In addition to these savings in handling and heating costs, the single continuous operation of preparing the cords for incorporation into elastomeric articles through application of an adhesion-promoting substance, drying, heating and stretching, cooling, heating and permitting shrinkage, cooling and then calendering is found to provide improved dimensional stability in the treated cords over that which is achieved when the several treatment steps are separately employed.

Although the invention has been specifically described with respect to the temperatures and tensions as utilized in the treatment of nylon cord, it will be evident that oher cords exhibiing elongation and shrinkage when heated can be advantageously treated by the procedure of this invention and, therefore, the invention is not to be considered as limited to nylon or to the specifically illustrated and described details except as may be required by the appended claims.

Having thus described the invention, I claim:
1. The process of preparing cords formed of high polymeric thermoplastic filaments for use as reinforce- ments in elastomeric articles, which cords have been subjected to heat setting under tension and cooled, the said process comprising tensioning said cords to an amount in the range of 0.25 to 0.75 pound per card, heating the tensioned cords to a temperature above 250° F. and less than that to which the cords were subjected during heat setting for a time interval of less than 30 seconds, cooling the cords while under said tension, immediately thereafter increasing the tension on the cords to an amount suitable for passage through a calender and calendering an elastomeric material on the cords while under the last-mentioned tension.

2. The process of preparing cords formed of high polymeric thermoplastic filaments for use as reinforcements in elastomeric articles, which cords have been subjected to heat setting under tension and cooled, the said process comprising tensioning said cords to an amount in the range of 0.25 to 0.75 pound per cord, heating the cords to a temperature in the range of 300° to 380° F. for a time interval of 5 to 25 seconds, cooling the cords while under said tension, immediately thereafter increasing the tension on the cords to an amount suitable for passage through a calender and calendering an elastomeric material on the cords while under the last-mentioned tension.

3. The process of preparing cords formed of linear polyamide filaments for use as reinforcements in elastomeric articles, which cords have been subjected to heat setting under tension and cooled, the said process comprising tensioning said cords to an amount in the range of 0.06 to 0.20 gram per denier, heating the cords to a temperature in the range of 300° to 380° F. for a time interval in the range of 5 to 25 seconds, cooling the cords while under said tension, immediately thereafter increasing the tension on the cords to an amount suitable for passage through a calender and calendering an elastomeric material on the cords while under the last-mentioned tension.

4. The process of preparing cords formed of high polymeric thermoplastic filaments for use as reinforcements in elastomeric articles, which cords have been subjected to heat setting under tension and cooled, the said process comprising tensioning said cords to an amount in the range of 0.25 to 0.75 pound per cord, heating the cords to a temperature of 350° to 380° F. for a time interval of 10 to 12 seconds, cooling the cords while under said tension, immediately thereafter increasing the tension on the cords to an amount suitable for passage through a calender and calendering an elastomeric material on the cords while under the last-mentioned tension.

5. The process of preparing cords formed of linear polyamide filaments for use as reinforcements in elastomeric articles, which cords have been subjected to heat setting under tension and cooled, the said process comprising tensioning said cords to an amount in the range of 0.06 to 0.20 gram per denier, heating the cords to a temperature of 350° to 380° F. for a time interval of 10 to 12 seconds, cooling the cords while under said tension, immediately thereafter increasing the tension on the cords to an amount suitable for passage through a calender and calendering an elastomeric material on the cords while under the last-mentioned tension.

6. The process of reducing elongation and heat shrinkage of cords formed of high polymeric thermoplastic filaments which comprises heating said cords to a temperature in the range of 400° to 450° F. for a time interval in the range of 4 to 15 seconds under a tension in the range of 3 to 5 pounds per cord, reducing the temperature of the cords to below 250° F. while the cords are still under said tension, thereafter reducing the tension on the cords to an amount in the range of 0.25 to 0.75 pound per cord, again heating the tensioned cords to a temperature above 250° and not above 380° F. for a time interval of less than 30 seconds and cooling the cords while under said tension of 0.25 to 0.75 pound per cord.

7. The process of reducing elongation and heat shrinkage of cords formed of high polymeric thermoplastic filaments which comprises heating said cords to a temperature in the range of 400° to 450° F. for a time interval in the range of 4 to 15 seconds under a tension in the range of 3 to 5 pounds per cord, reducing the temperature of the cords to below 250° F. while the cords are still under said tension, thereafter reducing the tension on the cords to an amount in the range of 0.25 to 0.75 pound per cord, again heating the cords to a temperature in the rage of 300° to 380° F. for a time interval of 5 to 25 seconds and cooling the cords while under said tension.

8. The process of reducing elongation and heat shrinkage of cords formed of high polymeric thermoplastic filaments which comprises heating said cords to a temperature in the range of 400° to 450° F. for a time interval in the range of 4 to 15 seconds under a tension of 3 to 5 pounds per cord, reducing the temperature of the cords to below 250° F. while the cords are still under said tension, thereafter reducing the tension on the cords to an amount in the range of 0.25 to 0.75 pound per cord, again heating the cords to a temperature in the range of 350° to 380° F. for a time interval in the range of 10 to 12 seconds and cooling the cords while under said tension.

9. The process of reducing elongation and heat shrinkage of cords formed of linear polyamide filaments which comprises heating said cords to a temperature in the range of 400° F. to 450° F. for a time interval in the range of 4 to 15 seconds under a tension in the range of 0.76 to 1.35 grams per denier, reducing the temperature of the cords to below 250° F. while the cords are still under said tension, thereafter reducing the tension on the cords to an amount in the range of 0.06 to 0.20 gram per denier, again heating the cords to a temperature of 350° to 380° F. for a time interval in the range of 10 to 12 seconds and cooling the cords while under the said reduced tension.

10. The process of preparing cords formed of linear polyamide filaments for use as reinforcements in elastomeric articles comprising assembling the cords in closely adjacent parallel relationship, moving said cords in the direction of their lengths and applying to the moving cords a liquid cord-to-elastomer adhesion-promoting substance, drying the cords, heating the dried cords to a temperature in the range of 400° to 450° F. for a time interval of 4 to 15 seconds while moving the cords under tension in the range of 3 to 5 pounds per cord, reducing the temperature of the moving cords to a value below 250° F. while maintaining the tension on the cords in the range of 3 to 5 pounds per cord, lowering the tension on the moving cords to an amount in the range of 0.25 to 0.75 pound per cord, heating the moving cords under the said reduced tension to a temperature above 250° F. and not above 380° F. for a time interval of less than 30 seconds and cooling the cords while under the said reduced tension.

11. The process as defined in claim 10 wherein the temperature to which the cords are heated under the said reduced tension is in the range of 300° to 380° F. and the time interval of heating at the reduced tension is in the range of 5 to 25 seconds.

12. The process as defined in claim 10 wherein the tension to which the cords are reduced is in the range of 0.50 pound and the temperature to which the cords are heated while under the said reduced tension is in the range of 350° F. and the time interval of such heating is in the range of 12 seconds.

13. The process as defined in claim 10 wherein the tension to which the cords are reduced is in the range of 0.75 pound per cord and the temperature to which the cords are heated under the said reduced tension is in the range of 360° to 380° F., the time interval of heating at the reduced tension being in the range of 10 seconds.

14. The process of preparing cords formed of linear polyamide filaments for use as reinforcements in elastomeric articles comprising assembling the cords in closely adjacent parallel relationship, moving said cords in the direction of their lengths and applying to the moving cords a liquid cord-to-elastomer adhesion-promoting substance, drying the cords, heating the dried cords to a temperature in the range of 400° to 450° F. for a time interval in the range of 4 to 15 seconds while moving the cords under tension in the range of 3 to 5 pounds per cord, reducing the temperature of the moving cords to a value below 250° F. while maintaining the tension on the cords in the range of 3 to 5 pounds pre cord, lowering the tension on the moving cords to an amount in the range of 0.25 to 0.75 pound per cord, heating the moving cords under the said reduced tension to a temperature above 250° F. and not above 380° F. for a time interval of less than 30 seconds, cooling the cords while under the said reduced tension, increasing the tension on the cords to an amount in the range of 1.0 to 1.5 pounds per cord and calendering elastomeric material on the cords while under the last-mentioned tension.

15. The process of preparing cords formed of linear polyamide filaments for use as reinforcements in elastomeric articles comprising assembling the cords in closely adjacent parallel relationship, moving said cords in the direction of their lengths and applying to the moving cords a liquid cord-to-rubber adhesion-promoting substance, drying the cords, heating the dried cords to a temperature in the range of 400° to 450° F. for a time interval in the range of 4 to 15 seconds while moving the cords under tension in the range of 0.76 to 1.35 grams per denier, reducing the temperature of the moving cords to a value below 250° F. while maintaining the tension on the cords in the range of 0.76 to 1.35 grams per denier, lowering the tension on the moving cords to an amount in the range of 0.06 to 0.20 gram per denier, heating the moving cords under the said reduced tension to a temperature in the range of 350° to 380° F. for a time interval in the range of 10 to 12 seconds, cooling the cords while under the said reduced tension, increasing the tension on the cords to an amount in the range of 0.25 to 0.38 gram per denier and calendering elastomeric material on the cords while under the last-mentioned tension.

16. The process of reducing elongation and heat shrinkage of cords formed of high polymeric thermoplatsic filaments which comprises heating said cords to a temperature in the range of 400 to 450° F. for a time interval in the range of 4 to 15 seconds under a tension in the range of 0.76 to 1.35 grams per denier, reducing the temperature of the cords to below 250° F. while the cords are still under said tension, thereafter reducing the tension on the cords to an amount in the range of 0.06 to 0.20 gram per denier, again heating the tensioned cords to a temperature above 250° and not above 380° F. for a time interval of less than 30 seconds and cooling the cords while under said tension of 0.06 to 0.20 gram per denier.

References Cited in the file of this patent

UNITED STATES PATENTS

| | | |
|---|---|---|
| 2,807,863 | Schenker | Oct. 1, 1957 |
| 2,846,752 | Lessig | Aug. 12, 1958 |

UNITED STATES PATENT OFFICE

CERTIFICATE OF CORRECTION

Patent No. 2,932,078 — April 12, 1960

Matthew W. Wilson

It is hereby certified that error appears in the printed specification of the above numbered patent requiring correction and that the said Letters Patent should read as corrected below.

Column 6, line 67, for "oher" read -- other --; same line, for "exhibiing" read -- exhibiting --; column 7, line 4, for "card" read -- cord --; line 19, for "Fl" read -- F. --; column 8, line 11, for "rage" read -- range --.

Signed and sealed this 18th day of October 1960.

(SEAL)
Attest:

KARL H. AXLINE
Attesting Officer

ROBERT C. WATSON
Commissioner of Patents